US012039919B2

(12) United States Patent
Hsu et al.

(10) Patent No.: US 12,039,919 B2
(45) Date of Patent: Jul. 16, 2024

(54) ELECTRONIC DEVICE

(71) Applicant: InnoLux Corporation, Miao-Li County (TW)

(72) Inventors: Yi-Hua Hsu, Miao-Li County (TW); Ker-Yih Kao, Miao-Li County (TW); Ming-Chun Tseng, Miao-Li County (TW); Mu-Fan Chang, Miao-Li County (TW); Wen-Lin Huang, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 0 days.

(21) Appl. No.: 18/131,135

(22) Filed: Apr. 5, 2023

(65) Prior Publication Data

US 2023/0252937 A1 Aug. 10, 2023

Related U.S. Application Data

(63) Continuation of application No. 17/543,218, filed on Dec. 6, 2021, now Pat. No. 11,651,727.

(30) Foreign Application Priority Data

Jan. 6, 2021 (CN) ......................... 202110011822.X

(51) Int. Cl.
*G09G 3/32* (2016.01)

(52) U.S. Cl.
CPC ......... *G09G 3/32* (2013.01); *G09G 2300/026* (2013.01); *G09G 2300/0408* (2013.01); *G09G 2300/0426* (2013.01)

(58) Field of Classification Search
CPC ....... G09G 3/32–3291; G09G 2300/02; G09G 2300/026; G09G 2300/0408; G09G 2300/0426; G09G 2310/0264; G09G 2310/04; G09G 2310/06; G09G 2310/08; G06F 3/14; G06F 3/1446
See application file for complete search history.

(56) References Cited

U.S. PATENT DOCUMENTS

| | | | | |
|---|---|---|---|---|
| 2004/0207315 | A1 | 10/2004 | Robbie et al. | |
| 2018/0190615 | A1 | 7/2018 | Pan | |
| 2018/0254226 | A1 | 9/2018 | Iguchi | |
| 2019/0066571 | A1 | 2/2019 | Goward | |
| 2020/0295120 | A1 | 9/2020 | Bower et al. | |
| 2020/0394953 | A1 | 12/2020 | Kim et al. | |
| 2021/0305185 | A1* | 9/2021 | Wu ...................... | G09G 3/3225 |
| 2022/0215794 | A1 | 7/2022 | Hsu et al. | |

* cited by examiner

*Primary Examiner* — Nathan Danielsen
(74) *Attorney, Agent, or Firm* — MUNCY, GEISSLER, OLDS & LOWE, P.C.

(57) ABSTRACT

An electronic device includes: a circuit board; a plurality of diodes disposed on a first surface of the circuit board; a plurality of first driving circuits disposed on the first surface of the circuit board and electrically connected to the plurality of diodes; and a plurality of second driving circuits electrically connected to the plurality of first driving circuits, wherein a part of the plurality of second driving circuits are disposed on a first substrate, and another part of the second driving circuits are disposed on a second substrate.

12 Claims, 5 Drawing Sheets

ELECTRONIC DEVICE

CROSS REFERENCE TO RELATED APPLICATION

This application claims the benefits of the Chinese Patent Application Serial Number 202110011822.X, filed on Jan. 6, 2021, the subject matter of which is incorporated herein by reference.

This application is a continuation (CA) of U.S. Patent application for "Light emitting device", U.S. application Ser. No. 17/543,218 filed Dec. 6, 2022, and the subject matter of which is incorporated herein by reference.

BACKGROUND

1. Field

The present disclosure relates to a light emitting device. More specifically, the present disclosure relates to a light emitting device in which light emitting units, pixel driving circuits and/or gate driving circuits may be disposed on different substrates.

2. Description of Related Art

In the conventional light emitting device, for example, a large-size public information display (PID) device, light emitting units, pixel driving circuits and gate driving circuits are disposed on the same substrate and then assembled with a circuit board. After packaging, cutting and splicing, the large-size public information display (PID) device can be obtained. When cutting the substrates disposed with the light emitting units, the pixel driving circuits and the gate driving circuits, if other components are disposed at the cutting edge of the substrate, it may cause moisture to enter between layers, resulting in the deterioration of the color rendering of the display device. Alternatively, as the resolution of the display device increased, the gaps between the light emitting units are decreased, so the spaces for disposing the pixel driving circuits and the gate driving circuits are also decreased. Thus, the pixel driving circuits or the gate driving circuits at the edges of the substrates may be damaged during cutting.

Therefore, it is desirable to provide a light emitting device to solve the aforesaid problems.

SUMMARY

The present disclosure relates to an electronic device, which comprises: a circuit board; a plurality of diodes disposed on a first surface of the circuit board; a plurality of first driving circuits disposed on the first surface of the circuit board and electrically connected to the plurality of diodes; and a plurality of second driving circuits electrically connected to the plurality of first driving circuits, wherein a part of the plurality of second driving circuits are disposed on a first substrate, and another part of the second driving circuits are disposed on a second substrate.

The present disclosure also relates to another electronic device, which comprises: a circuit board; a plurality of diodes disposed on a first surface of the circuit board; a plurality of first driving circuits disposed on a second surface of the circuit board opposite to the first surface of the circuit board and electrically connected to the plurality of diodes; and a plurality of second driving circuits electrically connected to the plurality of first driving circuits, wherein a part of the plurality of second driving circuits are disposed on a first substrate, and another part of the second driving circuits are disposed on a second substrate.

Other novel features of the disclosure will become more apparent from the following detailed description when taken in conjunction with the accompanying drawings.

BRIEF DESCRIPTION OF' THE DRAWINGS

DETAILED DESCRIPTION OF EMBODIMENT

Figure 1A:
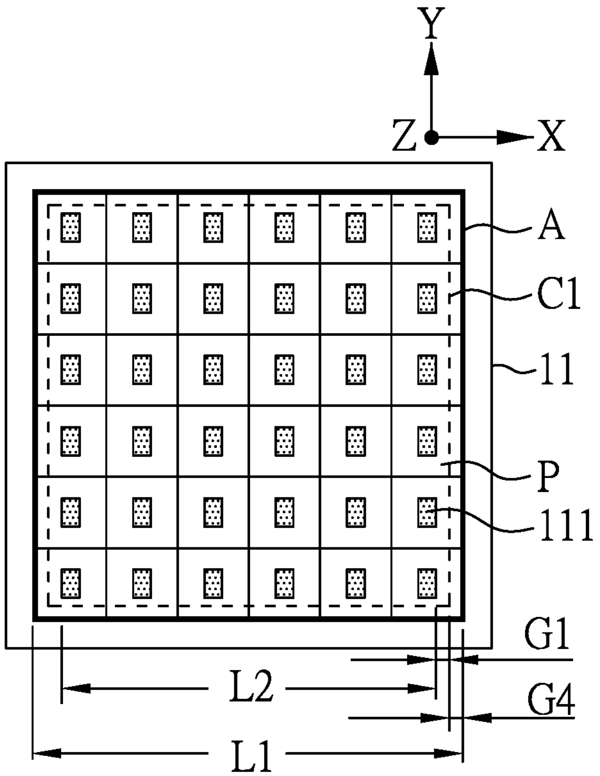
FIG. 1A is a schematic top view of a first substrate and light emitting units disposed thereon before cutting according to one embodiment of the present disclosure.

Different embodiments of the present disclosure are provided in the following description. These embodiments are meant to explain the technical content of present disclosure, but not meant to limit the scope of the present disclosure. A feature described in an embodiment may be applied to other embodiments by suitable modification, substitution, combination, or separation.

It should be noted that, in the present specification, when a component is described to have an element, it means that the component may have one or more of the elements, and it does not mean that the component has only one of the element, except otherwise specified.

Moreover, in the present specification, the ordinal numbers, such as "first" or "second", are used to distinguish a plurality of elements having the same name, and it does not means that there is essentially a level, a rank, an executing order, or an manufacturing order among the elements, except otherwise specified. A "first" element and a "second" element may exist together in the same component, or alternatively, they may exist in different components, respectively. The existence of an element described by a greater ordinal number does not essentially means the existent of another element described by a smaller ordinal number.

In the present specification, except otherwise specified, the feature A "or" or "and/or" the feature B means the existence of the feature A, the existence of the feature B, or the existence of both the features A and B. The feature A "and" the feature B means the existence of both the features A and B. The term "comprise(s)", "comprising", "include(s)", "including", "have", "has" and "having" means "comprise(s)/comprising but is/are/being not limited to".

Moreover, in the present specification, the terms, such as "top", "upper", "bottom" or "middle", as well as the terms, such as "on", "above", "over", "under", "below", or "between", are used to describe the relative positions among a plurality of elements, and the described relative positions may be interpreted to include their translation, rotation, or reflection.

Furthermore, the terms recited in the specification and the claims such as "above", "over", or "on" are intended not only directly contact with the other element, but also intended indirectly contact with the other element. Similarly, the terms recited in the specification and the claims such as "below", or "under" are intended not only directly contact with the other element but also intended indirectly contact with the other element.

In addition, the tem "adjacent" in the specification and claims is used to describe mutual proximity; and does not necessarily earl mutual contact.

Moreover, in the present specification, a value may be interpreted to cover a range within ±20% of the value, and in particular, a range within ±10%, ±5%, ±3%, ±2%, ±1% or ±0.5% of the value, except otherwise specified. The value provided in the present specification is an approximate value, which means the meaning "about" is also included in the present disclosure without specifically specifying "about".

In the present specification, except otherwise specified, the terms (including technical and scientific terms) used herein have the meanings generally known by a person skilled in the art. It should be noted that, except otherwise specified in the embodiments of the present disclosure, these terms (for example, the terms defined in the generally used dictionary) should have the meanings identical to those known in the art, the background of the present disclosure or the context of the present specification, and should not be read by an ideal or over-formal way.

In addition, the light emitting device disclosed in the present disclosure may include a display device, a touch display device, a curved display device or a free shape display device, but is not limited to this. The light emitting device can be a bendable or flexible light emitting device. The light emitting units of the light emitting device may include, for example, light emitting diode, quantum dot (QD), fluorescence, phosphor or other suitable display media, or a combination thereof, but is not limited to this. In the present disclosure, the light emitting diode may include, for example, OLED (organic light emitting diode), LED (light emitting diode), mini LED, micro LED, QD light emitting diode (for example, QLED, QDLED) or other suitable materials, or any combination thereof, but is not limited to this. The light emitting device may include, for example, a tiled light emitting device, but is not limited to this. It should be noted that the light emitting device can be any combination of the foregoing, but is not limited to this. In addition, the appearance of the light emitting device may be rectangular, circular, polygonal, a shape with curved edges; or other suitable shapes. The light emitting device may be provided with a driving system, a control system, a light source system, a shelf system or other peripheral systems to support a light emitting device or a tiled light emitting device. Hereinafter, a display device is used as an example to illustrate the light emitting device of the present disclosure, but the present disclosure is not limited thereto.

Figure 1B:
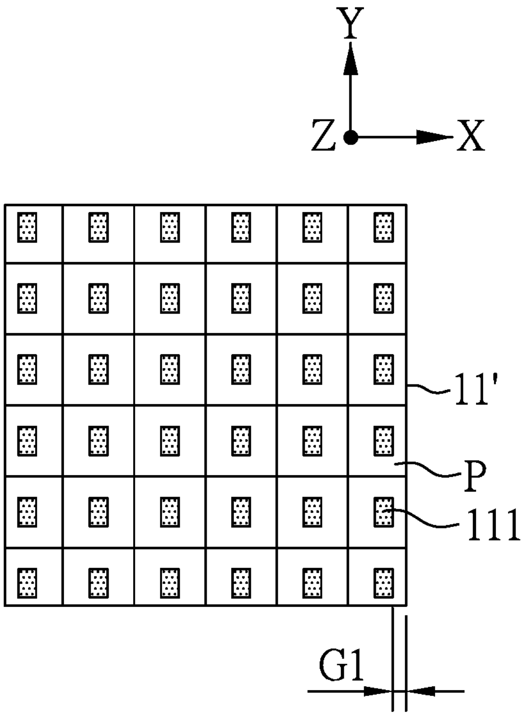
FIG. 1B is a schematic top view of a first substrate and light emitting units disposed thereon after cutting according to one embodiment of the present disclosure.

FIG. 1A and FIG. 1B respectively are schematic top views of a first substrate and light emitting units disposed thereon before and after cutting according to one embodiment of the present disclosure. First, as shown in FIG. 1A, a first mother substrate 11 is provided, wherein the first mother substrate 11 comprises a predetermined region A, and the predetermined region A (as shown in the thick frame) comprises a plurality of pixel regions P (as shown in the thin frame), and each of the pixel regions P is correspondingly disposed with a light emitting unit 111. Then, the first mother substrate 11 is cut along the cutting line C1 to obtain the first substrate 11' shown in FIG. 1B, wherein the first substrate 11' comprises a plurality of pixel regions P, and each of the pixel regions P is correspondingly disposed with a light emitting unit 111. Herein, the cutting line C1 and the outermost light emitting units 111 may be separated by a distance G1 in the X direction. The distance G1 in the X direction between the cutting line C1 and the outermost light emitting units 111 can ensure that the light emitting units 111 and/or the wirings under the light emitting units 111 should not be damage when cutting. In one embodiment of the present disclosure, the distance G1 may satisfy the following equation (I):

$$0\ \mu m \le G1 \le (L1 - L2 - (G4) \times 2)/2 \quad \text{(I)}$$

wherein L1 is the width of the predetermined region A in the X direction, L2 is the distance between the outermost edges of two outermost light emitting units 111 in the X direction, and G4 is the distance that the cutting line C1 has to be retracted from the predetermined region A. In another embodiment of the present disclosure, the distance G1 may satisfy the following equation (I'):

$$0\ \mu m < G1 < (L1 - L2 - (G4) \times 2)/2 \quad \text{(I')}.$$

Figure 2A:
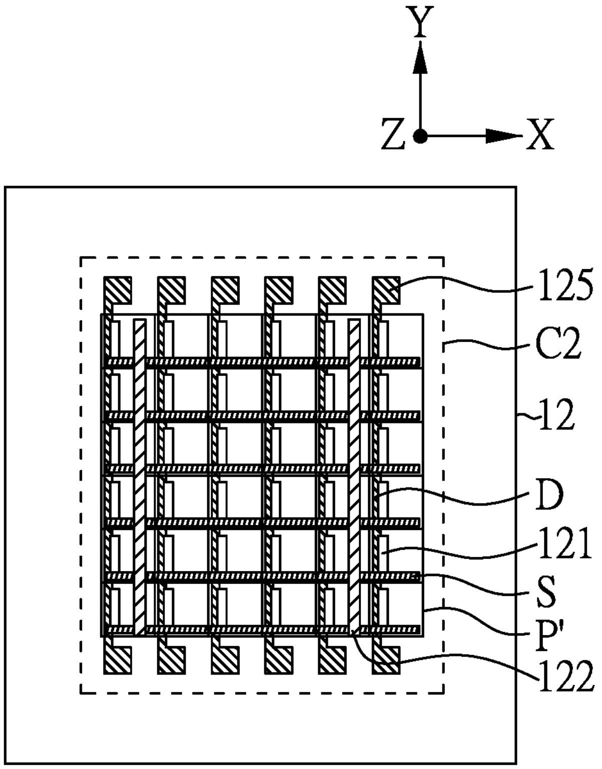
FIG. 2A is a schematic top view of a second substrate as well as pixel driving circuits and gate driving circuits disposed thereon before cutting according to one embodiment of the present disclosure.
Figure 2B:
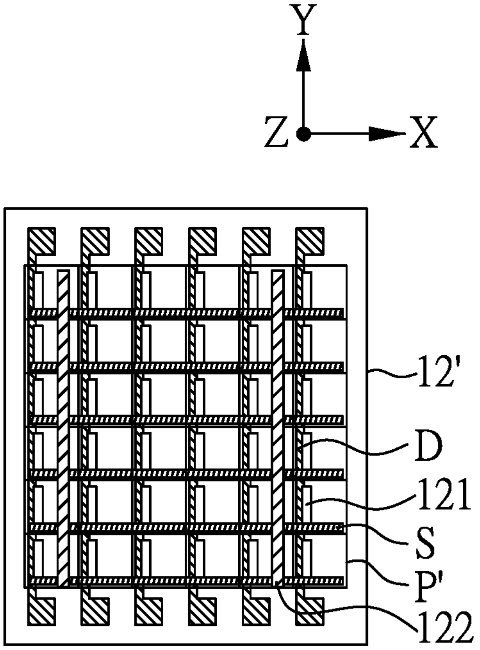
FIG. 2B is a schematic top view of a second substrate as well as pixel driving circuits and gate driving circuits disposed thereon after cutting according to one embodiment of the present disclosure.

FIG. 2A and FIG. 2B respectively are schematic top views of a second substrate as well as pixel driving circuits and gate driving circuits disposed thereon before cutting and after cutting according to one embodiment of the present disclosure. First, as shown in FIG. 2A, a second mother substrate 12 is provided, wherein a plurality of scan lines S, a plurality of data lines D and a plurality of pixel driving circuits 121 are disposed on the second mother substrate 12. Herein, the scan lines S intersect the data lines D, and the pixel driving circuits 121 respectively comprise a transistor. The scan line S is electrically connected to a gate electrode of the transistor, and the data line D is electrically connected to one end of the transistor. Herein, a plurality of gate driving circuits 122 are also disposed the second mother substrate 12 and electrically connected to the scan lines S, wherein the gate driving circuits 122 provide signals to the pixel driving circuits 121. Furthermore, detection pads 125 are further disposed on the second mother substrate 12 and electrically connected to the data lines D, wherein the detection pads 125 can be connected to an optical inspection equipment (not show the figure) for circuit detection. Then, the second mother substrate 12 is cut along the cutting line C2 to obtain the second substrate 12' shown in FIG. 2B, wherein the second substrate 12' comprises a plurality of pixel regions P', and each of the pixel regions P' is correspondingly disposed with a pixel driving circuit 121.

In the present embodiment, the first substrate 11' and the second substrate 12' may respectively include a flexible substrate or a non-flexible substrates, and the materials thereof include, for example, glass, quartz, wafer, sapphire, polycarbonate (PC), polyimide (PI), polypropylene (PP), polyethylene terephthalate (PET), other suitable materials or a combination of the aforementioned materials; but the present disclosure is not limited thereto. The materials of the first substrate 11' and the second substrate 12' may be the same or different, depending upon the designs. In one embodiment of the present disclosure, the materials of the first substrate 11' and the second substrate 12' comprise PI, but the present disclosure is not limited thereto.

Figure 3:
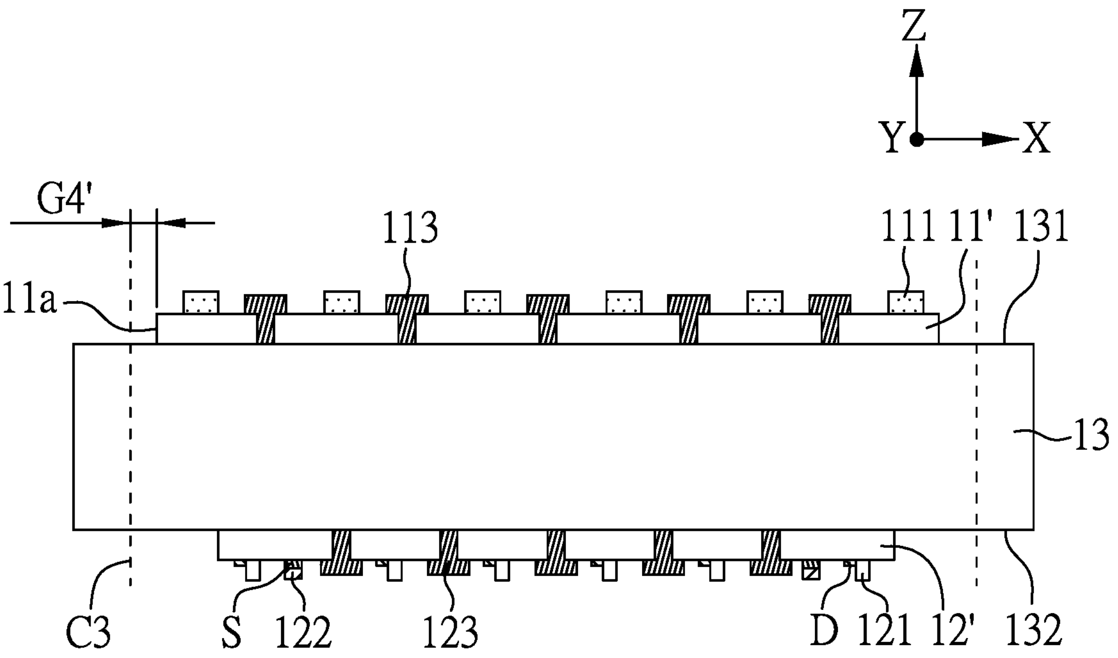
FIG. 3 is a schematic cross-sectional view of a light emitting device according to one embodiment of the present disclosure.

FIG. 3 is a schematic cross-sectional view of a light emitting device according to one embodiment of the present disclosure. After cutting the first mother substrate 11 and the second mother substrate 12 to obtain the first substrate 11' and the second substrate 12' (as shown in FIG. 1A to FIG. 2B), the first substrate 11' and the second substrate 12' are respectively disposed at two sides of a circuit board 13 to obtain the light emitting device of the present embodiment.

As shown in FIG. 3, the light emitting device of the present embodiment comprises: a circuit board 13; a plurality of substrates comprising a first substrate 11' and a second substrate 12', wherein the first substrate 11' is disposed on the circuit board 13, and the second substrate 12' is disposed on the circuit board 13 and overlapped with the first substrate 11'; a plurality of light emitting units 111 disposed on the first substrate 11'; a plurality of pixel driving circuits 121 electrically connected to the plurality of light emitting units 111; and a plurality of gate driving circuits 122 electrically connected to the plurality of pixel driving circuits 121, wherein at least a part of the plurality of pixel driving circuits 121 or at least a part of the plurality of gate driving circuits 122 are disposed on the second substrate 12'.

As shown in FIG. 3, in the light emitting device of the present embodiment, the circuit board 13 has a first surface 131 and a second surface 132 opposite to the first surface 131, and the first substrate 11' and the second substrate 12' are respectively disposed on the first surface 131 and the second surface 132 of the circuit board 13. In addition, the light emitting units 111 are disposed on the first substrate 11', and the pixel driving circuits 121 and the gate driving circuits 122 are disposed on the second substrate 12'.

Herein, the second substrate 12' is disposed on the second surface 132 of the circuit board 13, and the pixel driving circuits 121 are electrically connected to the light emitting units 111 through the circuit board 13. More specifically, as shown in FIG. 2B and FIG. 3, one end of the pixel driving circuit 121 is electrically connected to the data line D, and the other end of the pixel driving circuit 121 is electrically connected to the light emitting unit 111 through the circuit board 13. Thus, the purpose of electrically connecting the pixel driving circuits 121 and the light emitting units 111 through the circuit board 13 can be achieved.

As shown in FIG. 3, since the units (for example, the light emitting units 111) on the first substrate 11' is disposed on a surface of the first substrate 11' opposite to another surface of the first substrate 11' facing the circuit board 13, the units (for example, the light emitting units 111) on the first substrate 11' may be electrically connected to the circuit board 13 through bridging lines 113 penetrating the first substrate 11'. Since the units (for example, pixel driving circuits 121 or gate driving circuits 122) on the second substrate 12' are disposed on a surface of the second substrate 12' opposite to another surface of the second substrate 12' facing to the circuit board 13, the units (for example, pixel driving circuits 121 or gate driving circuits 122) on the second substrate 12' may also be electrically connected to the circuit board 13 through the bridging lines 123 penetrating the second substrate 12'. More specifically, the light emitting device of the present embodiment may further comprise a bridging line 123 penetrating the second substrate 12', and at least a part of the pixel driving circuits 121 may be electrically connected to the light emitting units 111 through the circuit board 13 and the bridging line 123. Similarly, the light emitting device of the present embodiment may further comprise another bridging line 113 penetrating the first substrate 11', and each of the light emitting units 111 may be electrically connected to the pixel driving circuits 121 through the bridging line 113 and the circuit board 13.

In the conventional light emitting device that all the light emitting units, the pixel driving circuits and the gate driving circuits are disposed on the same substrate, if the substrate disposed with all the aforesaid units is laminated on the circuit board, followed by packaging and cutting, it is not easy to meet the current requirements fir accuracy and the required cutting tolerance is large because the substrate and the circuit board are cut at the same time. In addition, because all the aforesaid units are disposed on the same substrate, the wiring range on the substrate is relatively large, and the wiring at the edge of the substrate may be damaged easily during cutting. Or, other components may be disposed at the cutting edge of the substrate, and it may cause moisture to enter between layers, resulting in the deterioration of the light emitting device.

Thus, in the light emitting device of the present embodiment, the light emitting units 111 and at least a part of the pixel driving circuits 121 and/or at least a part of the gate driving circuits 122 are disposed on different substrates, and then laminated on the circuit board 13 after cutting the substrates. Thus, the wiring range of one single substrate can be effective reduced, so the cutting tolerance can be increased, the problem of damaging the wiring on the substrate can be prevented, and/or the problem of moisture entrance caused by the destruction of layers can be avoided.

Figure 4:
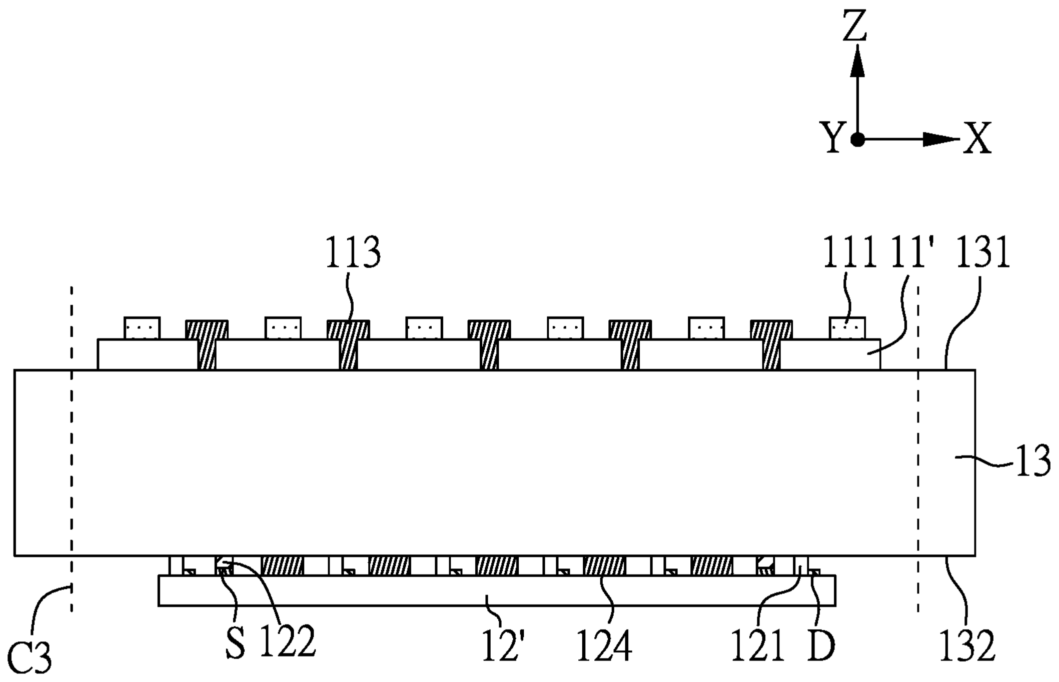
FIG. 4 is a schematic cross-sectional view of a light emitting device according to another embodiment of the present disclosure.

In another embodiment of the present disclosure, as shown in FIG. 4, the units (for example, pixel driving circuits 121 or gate driving circuits 122) on the second substrate 12' are disposed on a surface of the second substrate 12' facing the circuit board 13. Thus, the units (for example, pixel driving circuits 121 or gate driving circuits 122) on the second substrate 12' may be electrically connected to the circuit board 13 through the contact pads 124, and then electrically connected to the light emitting units 111 electrically connected to the circuit board 13.

Figure 5:
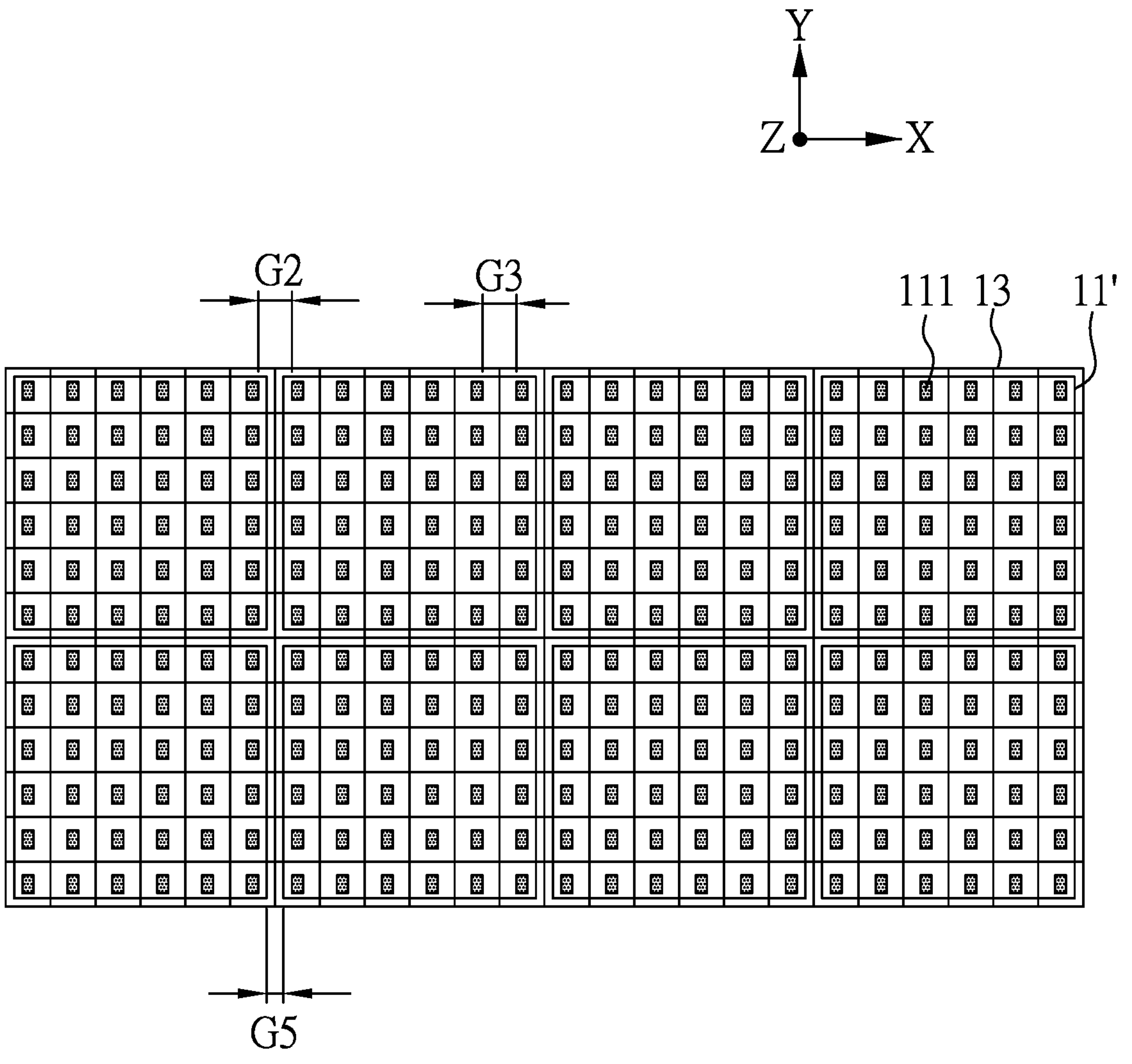
FIG. 5 is a schematic top view of a large-size public display device according to one embodiment of the present disclosure.

In FIG. 3 and FIG. 4, after the first substrate 11' and the second substrate 12' are respectively disposed on the first surface 131 and the second surface 132 of the circuit board 13, the circuit board 13 is cut along the cutting line C3, Finally, as shown in FIG. 5, a plurality of the light emitting devices shown in FIG. 3 or FIG. 4 are spliced after cutting to obtain the tiled light emitting device of the present embodiment. The tiled light emitting device may be used in a large-size public display device, but the present disclosure is not limited to this.

As shown in FIG. 5, in the tiled light emitting device of the present embodiment, the gap G2 between two adjacent light emitting units 111 of two adjacent first substrates 11' is substantially equal to the gap G3 between two adjacent light emitting units 111 on the same first substrate 11', to avoid the problem of the inconsistence in display images. In order to make the gap G2 substantially equal to the gap G3 and to avoid the risk of cutting the first substrate 11 when cutting the circuit board 13 (as shown in FIG. 3 or FIG. 4), as shown in FIG. 1A, the cutting line C1 has to be retracted by a distance G4 from the predetermined region A when cutting the first mother substrate 11, and the cutting line C1 may be separated from the outermost light emitting unit 111 by a distance G1.

In addition, as shown in FIG. 3 or FIG. 4, when cutting the circuit board 13, the position of the cutting line C3 may refer the position of the predetermined region A, More specifically, in the direction (X direction) perpendicular the normal direction of the substrate (Z direction), the position of the cutting line C3 may be separated from an edge 11*a* of the first substrate 11' by a distance G4', and this distance G4' may be substantially equal to the distance G4. Thus, after splicing the light emitting devices, as shown in FIG. 5, the purpose of the gap G2 substantially equal to the gap G3 can be achieved.

As shown in FIG. 1A and FIG. 5, when the cutting line C1 is retracted from the predetermined region A, the distance G5 between two adjacent first substrates 11 may satisfy the tolerance required for splicing, and this tolerance may compensate for the errors caused by cutting machines, cutting steps or other processes, Herein, the distance G5 between two adjacent first substrates 11' may be twice the distance G4' (as shown in FIG. 3). In the present embodiment, the distance G5 between two adjacent first substrates 11' may satisfy the following equation (II):

$$0\ \mu m \leq G5 \leq (L1-L2) \qquad \text{(II)}$$

wherein, L1 is the width of the predetermined region A in the X direction, and L2 is the distance between the outermost edges of two outermost light emitting units 111 in the X direction. In another embodiment, the distance G5 may satisfy the following equation (II'):

$$0\ \mu m < G5 \leq (L1-L2)/2 \qquad \text{(II')}.$$

in the conventional light emitting device that all the light emitting units, the pixel driving circuits and the gate driving circuits are disposed on the same substrate, if the substrate disposed with all the aforesaid units is laminated on the circuit board, followed by packaging and cutting, since the wirings near to the side of the substrate occupy a certain space, the splicing tolerance between two adjacent substrates is quite small to maintain the same pixel pitch after splicing. In other words, the alignment has to be very accurate when splicing, so that the problem of the inconsistence in display images will not be occurred. However, in the light emitting device of the present embodiment, the light emitting units 111 as well as at least a part of the pixel driving circuits 121 and/or at least a part of the gate driving circuits 122 are disposed on different substrates, so the distance G5 between two adjacent first substrates 11' can be increased to increase the tolerance required for splicing, and the problem of the inconsistence of display images caused by the inaccurate alignment of two substrates will not be easily occurred.

In FIG. 1A to FIG. 5, the distances G1, G4, G4', G5, the gaps G2, G3, the width L1 and the distance L2 are exemplified in one direction (X direction) perpendicular to the normal direction of the substrate (Z direction). The distances, the gaps and the widths in another direction (Y direction) perpendicular to the normal direction of the substrate (Z direction) may also be designed by the same manner described above, which are not repeated again.

FIG. 6 to FIG. 13 are schematic cross-sectional views according to different embodiments of the present disclosure. In the embodiments shown in FIG. 6 to FIG. 13, for the convenience of explanation, the bridging lines 113, 123 shown in FIG. 3 or the contact pads 124 shown in FIG. 4 are omitted. In addition, in FIG. 6 to FIG. 11 and FIG. 13, the second substrate 12' and/or the third substrate 14' may be electrically connected to the circuit board 13 by the manner shown in FIG. 3 or FIG. 4.

Figure 6:
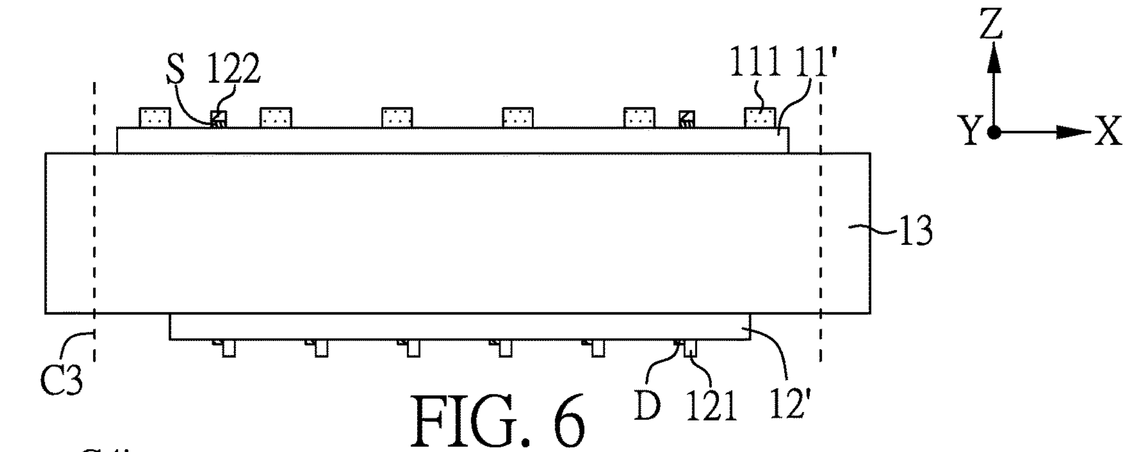
FIG. 6 to FIG. 13 are schematic cross-sectional views according to different embodiments of the present disclosure.

The embodiment shown in FIG. 6 is similar to the embodiment shown in FIG. 3. One difference is that, in the embodiment shown in FIG. 6, at least part of the gate driving circuits 122 are disposed on the first substrate 11'.

Figure 7:
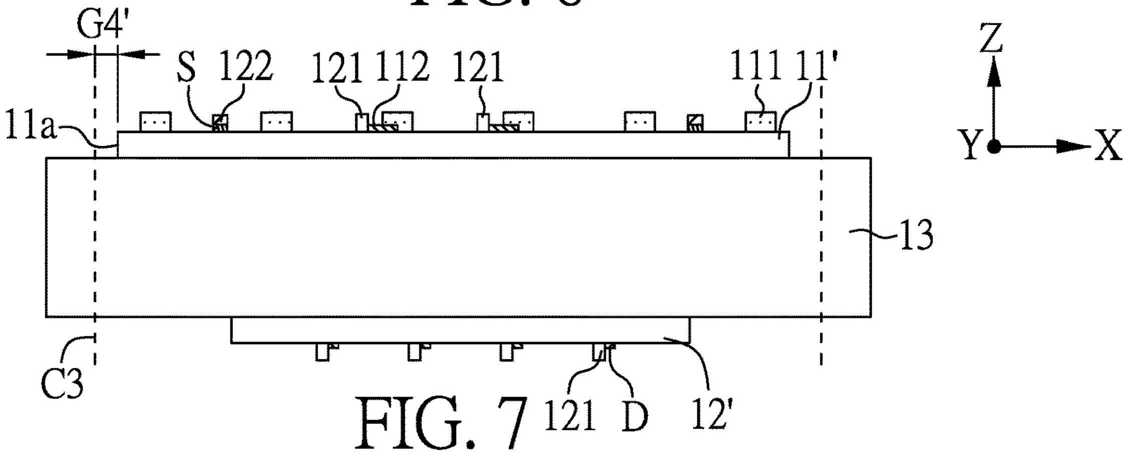

The embodiment shown in FIG. 7 is similar to the embodiment shown in FIG. 6, and the differences between the embodiments shown in FIG. 6 and FIG. 7 are as follows. In the embodiment shown in FIG. 7, another part of the pixel driving circuits 121 are disposed on the first substrate 11', and the data lines (not shown in the figure) electrically connected to the pixel driving circuits 121 disposed on first substrate 11' are also disposed on the first substrate 11'. In addition, the pixel driving circuits 121 on the first substrate 11' are electrically connected to the light emitting units 111 through contact pads 112. In the present embodiment, the pixel driving circuits 121 electrically connected to the light emitting units 111 closest to the edges 11*a* of the first substrate 11' are still disposed on the second substrate 12', and the pixel driving circuits 121 disposed on the first substrate 11' are the pixel driving circuits 121 electrically connected to the light emitting units 111 which is not closest to the edges 11*a* of the first substrate 11'. It is because when the pixel driving circuits 121 electrically connected to the light emitting units 111 which are disposed closest to the edge 11*a* of the first substrate 11' are still disposed on the second substrate 12', the retracted distance for cutting the first mother substrate can be increased, and the distance G4' between the cutting line C3 and the edges 11*a* of the first substrate 11' can be increased. Thus, the tolerance required for splicing two adjacent first substrates 11' (for example, the distance G5 shown in FIG. 5) can be increased.

Figure 8:
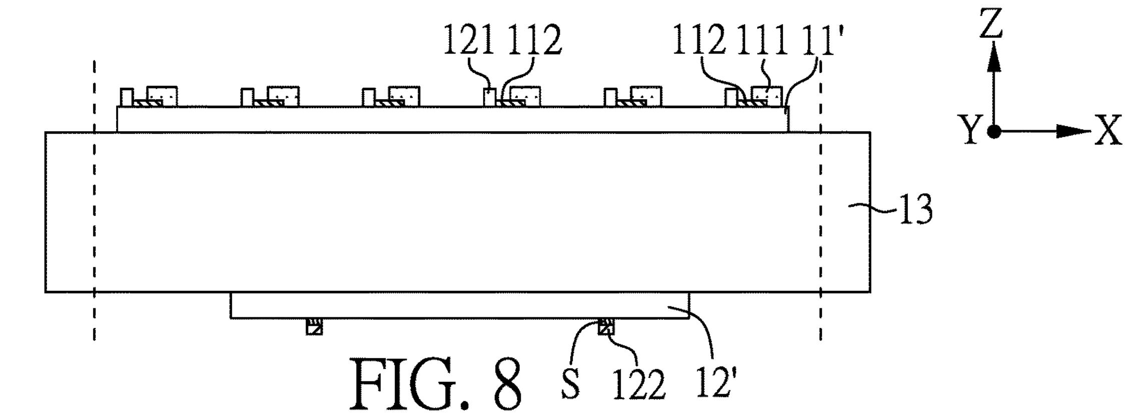

The embodiment shown in FIG. 8 is similar to the embodiment shown in FIG. 3, and the differences between the embodiments shown in FIG. 8 and FIG. 3 are as follows. In the embodiment shown in HG 8, all the pixel driving circuits 121 are disposed on the first substrate 11', and the data lines (not shown in the figure) electrically connected to the pixel driving circuits 121 disposed on the first substrate 11' are also disposed on the first substrate 11'. In addition, the pixel driving circuits 121 disposed on the first substrate 11' are electrically connected to the light emitting units 111 through contact pads 112. Thus, in the present embodiment, the second substrate 12' is not disposed with the pixel driving circuits 121 and only disposed with the gate driving circuits 122.

Figure 9:
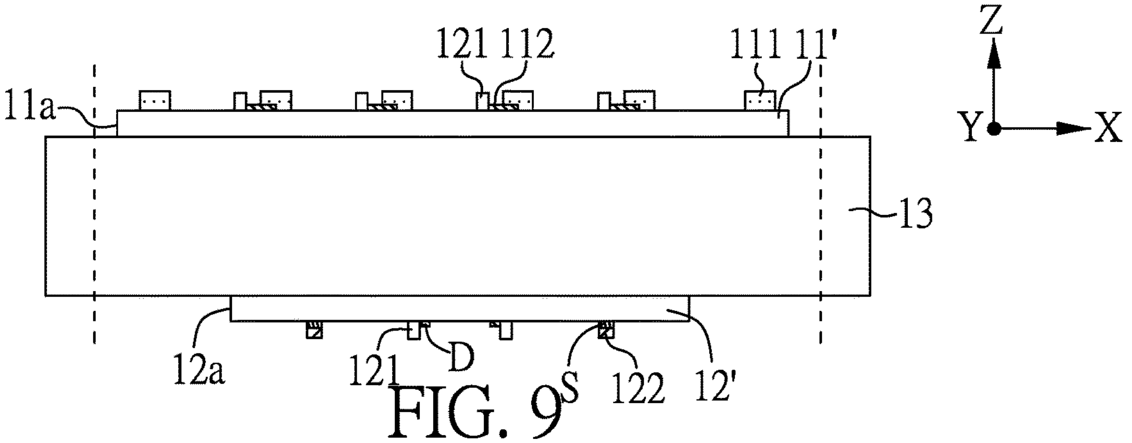

The embodiment shown in FIG. 9 is similar to the embodiment shown in FIG. 3, and the differences between the embodiments shown in FIG. 9 and FIG. 3 are as follows. In the embodiment shown in FIG. 9, at least a part of the pixel driving circuits 121 are disposed on the first substrate 11', and the data lines (not shown in the figure) electrically connected to the pixel driving circuits 121 disposed on first substrate 11' are also disposed on the first substrate 11'. In addition, the pixel driving circuits 121 on the first substrate 11' are electrically connected to the light emitting units 111 through contact pads 112. In the present embodiment, the pixel driving circuits 121 disposed on the first substrate 11' are the pixel driving circuits 121 electrically connected to the light emitting units 111 which is not closest to the edges 11*a* of the first substrate 11'. The reason has been described above and is not repeated again. Furthermore, in the present embodiment, the gate driving circuits 122 are adjacent to the edges 12*a* of the second substrate 12', but the present disclosure is not limited thereto. In another embodiment of the present disclosure, a part of the pixel driving circuits 121 may be adjacent to the edges 12*a* of the second substrate 12'. In further another embodiment of the present disclosure, a part of the gate driving circuits 122 may be adjacent to the edges 12*a* of the second substrate 12', and a part of the pixel driving circuits 121 may be adjacent to the edges 12*a* of the second substrate 12.

Figure 10:
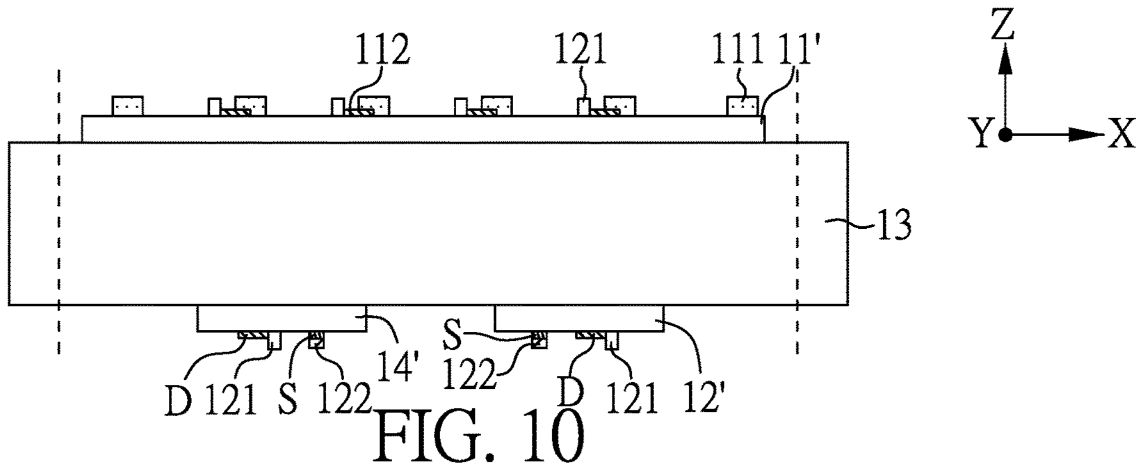

The embodiment shown in FIG. 10 is similar to the embodiment shown in FIG. 9, and the differences between the embodiments shown in FIG. 10 and FIG. 9 are as follows. In the embodiment shown in FIG. 10, the plurality of substrates further comprise a third substrate 14', and another part of the gate driving circuits 122 are disposed on the third substrate 14'. More specifically, in the present embodiment, the second substrate 12' is disposed with a part of the pixel driving circuits 121 and a part of the gate driving circuits 122, and the third substrate 14' is also disposed with a part of the pixel driving circuits 121 and a part of the gate driving circuits 122.

Figure 11:
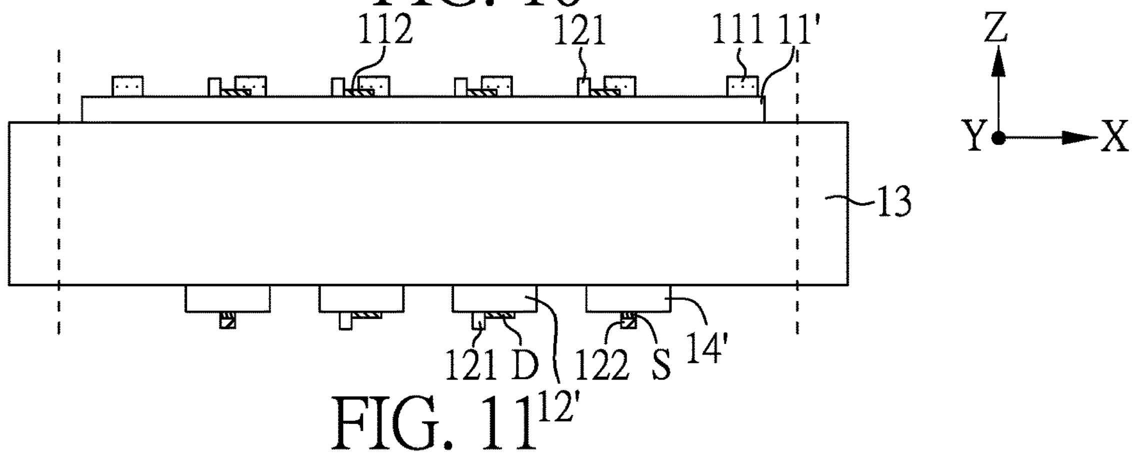

The embodiment shown in FIG. 11 is similar to the embodiment shown in FIG. 10. One difference is that, in the embodiment shown in FIG. 11, the second substrate 12' is disposed with a part of the pixel driving circuits 121, and the third substrate 14' is disposed with a part of the gate driving circuits 122.

Except for the embodiments shown in FIG. 10 and FIG. 11, the present disclosure further provides other embodiments similar to the embodiments shown in FIG. 10 and FIG. 11. In one embodiment of the present disclosure, the pixel driving circuits 121 may be disposed on the first substrate 11' and the gate driving circuits 122 may be disposed on one or more third substrate 14'. In another embodiment of the present disclosure, the pixel driving circuits 121 may be disposed on one or more second substrate 12', and the gate driving circuits 122 may be disposed on one or more third substrate 14'. In another embodiment of the present disclosure, the light emitting units 111 and the gate driving circuits 122 may be disposed on the first substrate 11', and the pixel driving circuits 121 may be disposed on one or more second substrate 12'. In further another embodiment of the present embodiment, the light emitting units 111, a part of the pixel driving circuits 121 and a part of the gate driving circuits 122 may be disposed on the first substrate 11', and the remaining pixel driving circuits 12:1 and the remaining gate driving circuits 122 may be disposed on one or more second substrate 12' or on one or more third substrate 14'.

Figure 12:
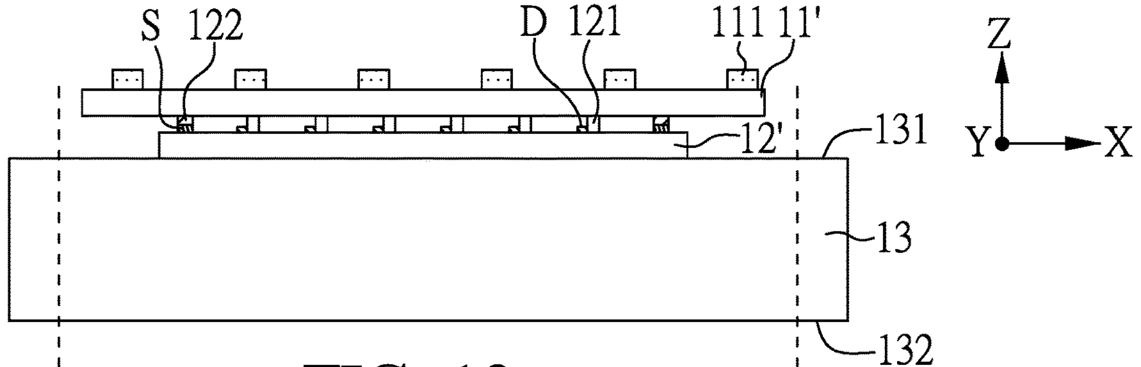

The embodiment shown in FIG. 12 is similar to the embodiment shown in FIG. 3. One difference is that, in the embodiment shown in FIG. 12, the second substrate 12' is disposed on the first surface 131 of the circuit board 13, and disposed between the first substrate 11' and the circuit board 13. In another embodiment, a part of the pixel driving circuits 121 may be disposed on the first substrate 11'. In another embodiment of the present disclosure, a part of the gate driving circuits 122 may be disposed on the first substrate 11'. In further another embodiment of the present disclosure, a part of the pixel driving circuits 121 and a part of the gate driving circuits 122 may be disposed on the first substrate 11'.

Figure 13:
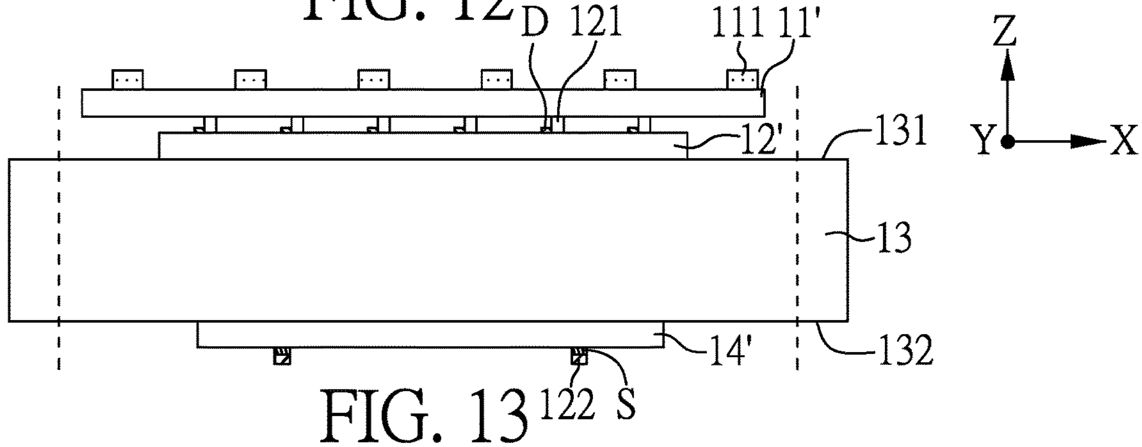

The embodiment shown in FIG. 13 is similar to the embodiment shown in FIG. 12. One difference is that, in the embodiment shown in FIG. 13, the plurality of substrates further comprise a third substrate 14', and a part of the gate driving circuits 122 are disposed on the third substrate 14'. In another embodiment of the present disclosure, a part of the pixel driving circuits 121 may be disposed on the first substrate 11'. In further another embodiment of the present disclosure, the plurality of substrates may further comprise one or more third substrate 14', and the gate driving circuits 122 may be disposed on one or more third substrate 14'.

In the embodiments shown in FIG. 3 and FIG. 4, the pixel driving circuits 121 and the gate driving circuits 122 are disposed on the second surface 132 of the circuit board 13. Thus, the pixel driving circuits 121 and the gate driving circuits 122 may be electrically connected to the light emitting units 111 through the wirings inside the circuit board 13.

In the embodiments shown in FIG. 6 to FIG. 13, at least a part of the pixel driving circuits 121 and/or at least a part of the gate driving circuits 122 are disposed on the first surface 131 of the circuit board 13. Thus, at least a part of the pixel driving circuits 121 and/or at least a part of the gate driving circuits 122 disposed on the first surface 131 of the circuit board 13 may be electrically connected to the light emitting units 111 without using the wirings inside the circuit board 13, so the design of the wirings inside the circuit board 13 may be simplified.

In the aforesaid embodiments of the present disclosure, the light emitting devices having light emitting units arranged in a 6×6 array are exemplified, but the number of the light emitting units arranged in the light emitting device of the present disclosure is not limited thereto and may be adjusted according to the design or need. In addition, in the aforesaid embodiments of the present disclosure, the tiled light emitting device formed by the light emitting devices arranged in a 2×4 array are exemplified, but the number of the light emitting devices arranged in the tiled light emitting device of the present disclosure is also not limited thereto and may be adjusted according to the design or need.

In the present disclosure, the features in different embodiments of the present disclosure can be mixed to limn another embodiment without departing from the spirit and scope of the disclosure as hereinafter claimed.

Although the present disclosure has been explained in relation to its embodiment, it is to be understood that many other possible modifications and variations can be made without departing from the spirit and scope of the disclosure as hereinafter claimed.

In addition, the aforesaid embodiments are examples for convenience of description, and the claimed scope of the present disclosure should be subjected to the claims, rather than being limited to the aforesaid embodiments.

What is claimed is:

1. An electronic device, comprising:

a circuit board;

a plurality of diodes disposed on a first surface of the circuit board;

a plurality of first driving circuits disposed on the first surface of the circuit board and electrically connected to the plurality of diodes;

a plurality of second driving circuits electrically connected to the plurality of first driving circuits;

a third substrate disposed on the circuit board, wherein a part of the plurality of first driving circuits are disposed on the third substrate; and a fourth substrate disposed on the circuit board, wherein another part of the plurality of first driving circuits are disposed on the fourth substrate, wherein a part of the plurality of second driving circuits are disposed on a first substrate, and another part of the plurality of second driving circuits are disposed on a second substrate.

2. The electronic device of claim 1, wherein the first substrate and the second substrate are disposed on a second surface of the circuit board opposite to the first surface of the circuit board.

3. The electronic device of claim 1, wherein the third substrate further comprises a first conductive line, and one of the part of the plurality of first driving circuits on the third substrate is electrically connected to the circuit board through the first conductive line.

4. The electronic device of claim 3, wherein the first substrate further comprises a second conductive line, and one of the part of the plurality of second driving circuits on the first substrate is electrically connected to the circuit board through the second conductive line.

5. The electronic device of claim 4, wherein the second conductive line is electrically connected to the first conductive line through the circuit board.

6. The electronic device of claim 1, wherein the plurality of first driving circuits comprise at least one transistor.

7. An electronic device, comprising:

a circuit board;

a plurality of diodes disposed on a first surface of the circuit board;

a plurality of first driving circuits disposed on a second surface of the circuit board opposite to the first surface of the circuit board and electrically connected to the plurality of diodes; a plurality of second driving circuits electrically connected to the plurality of first driving circuits;

a third substrate disposed on the circuit board, wherein a part of the plurality of first driving circuits are disposed on the third substrate; and a fourth substrate disposed on the circuit board, wherein another part of the plurality of first driving circuits are disposed on the fourth substrate, wherein a part of the plurality of second driving circuits are disposed on a first substrate, and another part of the plurality of second driving circuits are disposed on a second substrate.

8. The electronic device of claim 7, wherein the first substrate and the second substrate are disposed on the second surface of the circuit board.

9. The electronic device of claim 7, wherein the third substrate further comprises a first conductive line, and one of the part of the plurality of first driving circuits on the third substrate is electrically connected to the circuit board through the first conductive line.

10. The electronic device of claim 9, wherein the first substrate further comprises a second conductive line, and one of the part of the plurality of second driving circuits on the first substrate is electrically connected to the circuit board through the second conductive line.

11. The electronic device of claim 10, wherein the second conductive line is electrically connected to the first conductive line through the circuit board.

12. The electronic device of claim 7, wherein the plurality of first driving circuits comprise at least one transistor.

* * * * *